United States Patent
Jiang et al.

(10) Patent No.: US 9,201,663 B2
(45) Date of Patent: Dec. 1, 2015

(54) COMPUTER SYSTEM AND REMOTE CONTROL METHOD FOR COMPUTER DEVICE

(71) Applicant: Acer Incorporated, New Taipei (TW)

(72) Inventors: Shu-Yu Jiang, New Taipei (TW); I-Feng Tsai, New Taipei (TW); Chuan-Ming Tsai, New Taipei (TW); Ching-Yi Lin, New Taipei (TW)

(73) Assignee: Acer Incorporated, New Taipei (TW)

( * ) Notice: Subject to any disclaimer, the term of this patent is extended or adjusted under 35 U.S.C. 154(b) by 271 days.

(21) Appl. No.: 14/016,143

(22) Filed: Sep. 2, 2013

(65) Prior Publication Data
US 2014/0223164 A1    Aug. 7, 2014

(30) Foreign Application Priority Data
Feb. 1, 2013   (TW) .............................. 102103984 U (51) Int. Cl.
*G06F 1/32* (2006.01)
*G06F 9/44* (2006.01)
*H04L 12/12* (2006.01)

(52) U.S. Cl.
CPC ............ *G06F 9/4418* (2013.01); *G06F 1/3209* (2013.01); *H04L 12/12* (2013.01)

(58) Field of Classification Search
CPC ...... G06F 1/3209; G06F 9/4418; H04L 12/12
See application file for complete search history.

(56) References Cited

U.S. PATENT DOCUMENTS

| | | | |
|---|---|---|---|
| 6,379,058 B1* | 4/2002 | Petteruti et al. | 400/76 |
| 2003/0206564 A1* | 11/2003 | Mills et al. | 370/528 |
| 2010/0165898 A1* | 7/2010 | Tang et al. | 370/311 |
| 2010/0262681 A1* | 10/2010 | Chang et al. | 709/221 |
| 2012/0051260 A1* | 3/2012 | Tamaki | 370/253 |
| 2012/0278636 A1 | 11/2012 | Lin et al. | |

FOREIGN PATENT DOCUMENTS

| | | |
|---|---|---|
| TW | 201025917 | 7/2010 |
| TW | 201119341 | 6/2011 |

* cited by examiner

*Primary Examiner* — Mark Connolly
(74) *Attorney, Agent, or Firm* — Jianq Chyun IP Office (57) ABSTRACT

A computer system and a remote control method for a computer device are provided. The computer system includes a computer device and a remote device. The computer device includes a network communication unit and an ID table. Before the computer device enters into a power-saving state, the computer device reads an ID code of the network communication unit and searches the ID table according to the ID code to obtain a particular packet format type. The computer device sends an agreement packet including a message of the particular packet format type to notify the remote device. The computer device receives a response packet from the remote device for setting a packet receiving procedure and enters into the power-saving state. When the computer device receives a wake-up packet compliant with the packet receiving procedure from the remote device, the computer device returns to a normal operation state.

16 Claims, 5 Drawing Sheets

COMPUTER SYSTEM AND REMOTE CONTROL METHOD FOR COMPUTER DEVICE

CROSS-REFERENCE TO RELATED APPLICATION

This application claims the priority benefit of Taiwan application serial no. 102103984, filed on Feb. 1, 2013. The entirety of the above-mentioned patent application is hereby incorporated by reference herein and made a part of this specification.

BACKGROUND OF THE INVENTION

1. Field of the Invention

The disclosure is directed to a Wake-on-LAN (WOL) technology; more particularly, the disclosure relates to a remote control system and a remote control method.

2. Description of Related Art

The Wake-on-LAN (WOL) technology allows a user to remotely issue a command to a computer host through another host (the so-called "cloud host") through the local area network (LAN, e.g., Ethernet, wireless network, etc.), so as to power on the computer host originally in a power-off mode, wake up the computer host from a sleep mode, or return the computer host to an operation state. According to the types of given software and hardware, the WOL technology may also include other remote control mechanisms, e.g., mechanisms of remotely powering off or restarting the computer host. However, implementation of the WOL technology and the related protocols may be frustrating because it requires support from the appropriate network card or appropriate network chip to function reliably.

Although the WOL protocols have been gradually developed and adjusted, not all kinds of the WOL protocols may be supported by the existing network chips. For instance, early network chips may not be able to support the recent WOL protocols, and some network chips may selectively support certain low-level WOL protocols due to the power supply issue of the computer host. Therefore, according to the related art, the prevailing WOL mechanisms often comply with the most extensively applied protocols. This unfortunately leads to the fact that the network chips with favorable supportability may not be fully utilized in practice.

As a result, in terms of implementation of the WOL technology, how to optimize the hardware performance of the computer host in a spontaneously manner is an issue to be resolved in the field pertinent to cloud computing.

SUMMARY OF THE INVENTION

The disclosure is directed to a computer system and a remote control method for a computer device capable of implementing the required Wake-on-LAN (WOL) technology by optimizing the performance of network chips in the computer device without sacrificing the network security.

In an exemplary embodiment of the disclosure, a computer system that includes a computer device and a remote device is provided. The computer device includes a network communication unit and an ID table. The remote device communicates with the computer device through a network. Before the computer device enters into a power-saving state from a normal operation state, the computer device reads an ID code of the network communication unit, searches the ID table according to the ID code to obtain a particular packet format type corresponding to the ID code, and sends an agreement packet to notify the remote device. Here, the agreement packet includes a message of the particular packet format type. The computer device receives a response packet from the remote device to set a packet receiving procedure in the computer device and enters into the power-saving state. A connection between the computer device in the power-saving state and the remote device is maintained according to a specific way. When the computer device receives a wake-up packet from the remote device, and the wake-up packet complies with the packet receiving procedure, the computer device returns to the normal operation state.

According to an exemplary embodiment of the disclosure, the ID table includes the ID codes respectively corresponding to a plurality of the network communication units, each of the ID codes corresponds to one of a plurality of packet format types, and the particular packet format type belongs to one of the packet format types.

According to an exemplary embodiment of the disclosure, after the remote device receives the agreement packet, the remote device sets a wake-up packet format type corresponding to the computer device according to the message of the particular packet format type and sends the response packet, and the response packet includes a message of the wake-up packet format type.

According to an exemplary embodiment of the disclosure, the ID code includes a vender ID (VID) code, a device ID (DID) code, a sub-vendor ID (SVID) code, and/or a sub-device ID (SDID) code.

In another exemplary embodiment of the disclosure, a remote control method for a computer device is provided, and the computer device includes a network communication unit. The remote control method includes following steps. Before the computer device enters into a power-saving state from a normal operation state, an ID code of the network communication unit is read. An ID table is searched according to the ID code to obtain a particular packet format type corresponding to the ID code. An agreement packet is sent to notify the remote device, and the agreement packet includes a message of the particular packet format type. A response packet is received from the remote device to set a packet receiving procedure in the computer device, and the remote control method also includes the step of entering into the power-saving state. In the power-saving state, a connection with the remote device is maintained according to a specific way. When a wake-up packet is received from the remote device, and the wake-up packet complies with the packet receiving procedure, the remote control method also includes the step of returning to the normal operation state from the power-saving state.

Other details for implementing the remote control method of the computer device are provided above and thus will not be further given hereinafter.

In another exemplary embodiment of the disclosure, a remote control method for a remote device is provided. The remote control method includes following steps. It is determined whether an agreement packet of a computer device is received, and the agreement packet includes a message of a particular packet format type and a message that the computer device is about to enter into a power-saving state. After the agreement packet is received, a wake-up packet format type corresponding to the computer device is set according to the message of the particular packet format type. A connection with the computer device is maintained according to a specific way while the computer device is in the power-saving state, so as to learn a state of the computer device. A response packet is sent to the computer device, and the response packet includes a message of the wake-up packet format type.

Whether to receive a remote control request from the computer device through a network is determined. When the remote control request is received, a wake-up packet complying with the computer device is sent, such that the remote device and the computer device are communicated with each other.

In view of the above, before the computer device described herein enters into a power-saving state (e.g., a standby state, a sleep state, a power-off state, or a communication standby state) from the normal operation state, the maker and the model number of the network communication unit (e.g., the network chip) within the computer device are looked up, so as to learn the WOL packet format type that has the optimal performance and is supportable by the network communication unit and notify the remote device of said WOL packet format type through the network. Thereby, before entering into the power-saving state, the computer device, together with the remote device, may confirm and set the WOL packet format type. As such, the required WOL technology may be implemented by optimizing the performance of network chips in the computer device without sacrificing the network security.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DESCRIPTION OF EMBODIMENTS

Figure 1:
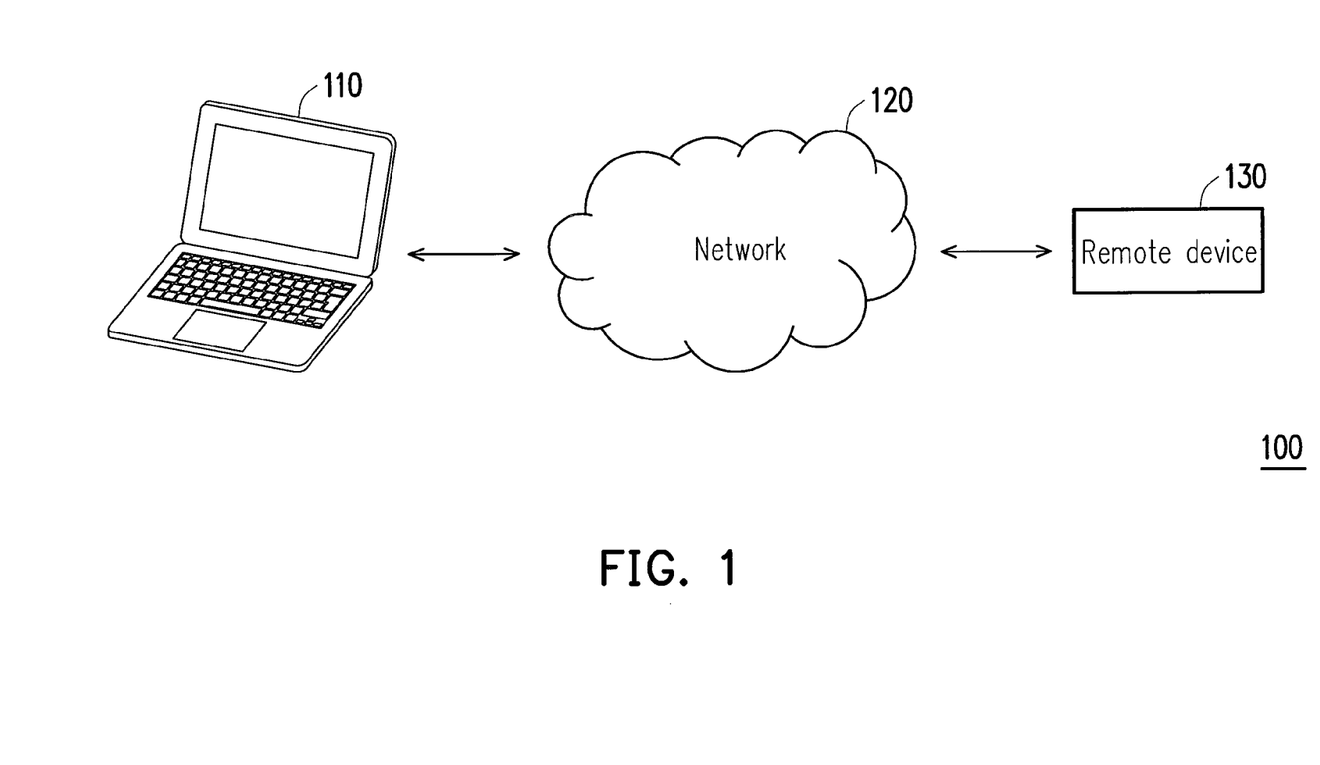
FIG. 1 is a schematic diagram illustrating a computer system capable of remotely controlling a computer device according to an exemplary embodiment of the disclosure.

FIG. 1 is a schematic diagram illustrating a computer system 100 capable of remotely controlling a computer device 110 according to an exemplary embodiment of the disclosure. With reference to FIG. 1, the computer system 100 includes the computer device 110 and a remote device 130. The computer device 110 may be a desktop computer, a notebook computer, a tablet PC that can be connected to the internet, or any corresponding electronic device owned by a user. In a normal operation state, the computer device 110 may communicate with the remote device 130 through a network 120 (the remote device 130 is in the network 120). The remote device 130 may be a cloud server in the network 120 or a group of servers constituted by plural physical devices through applying the cloud hardware sharing technology. In the present exemplary embodiment, the remote device 130 has various kinds of hardware and is thus able to provide diverse hardware supports required for implementing the Wake-on-LAN (WOL) technology.

Figure 2:
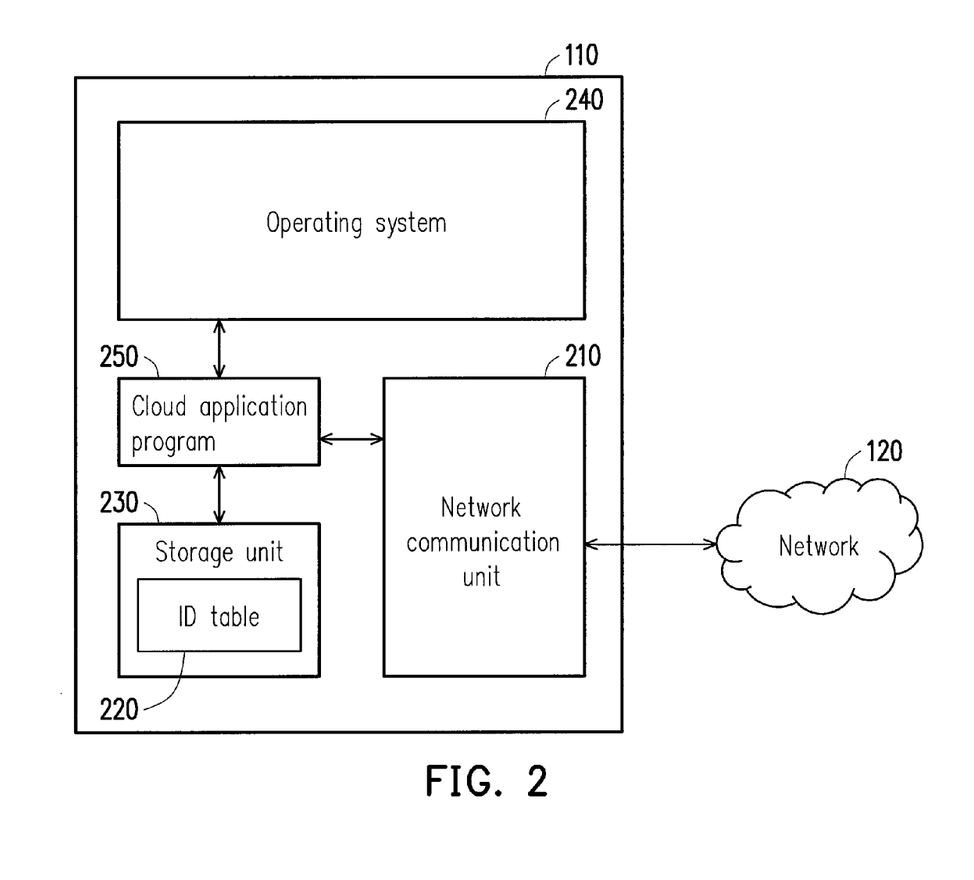
FIG. 2 is a block diagram illustrating main functions of the computer device depicted in FIG. 1.

FIG. 2 is a block diagram illustrating main functions of the computer device 110 depicted in FIG. 1. The computer device 110 includes a network communication unit 210 and an ID table 220 that is stored in a storage unit 230. Besides, the computer device 110 also includes some application programs (e.g., a cloud application program 250) and an operating system 240 constituted by a central processing unit and software programs. The adopted or adjusted WOL protocol described herein may be implemented by executing the cloud application program 250 through the hardware support from the network communication unit 210. The network communication unit 210 may be a physical Ethernet card and/or a wireless network card as well as the network chip used therein. Generally, each network chip has its unique ID code, such that the operating system 240 of the computer device 110 is able to execute a driver corresponding to the ID code and thereby drive the network communication unit 210.

Each network communication unit 210 (e.g., a network card or a network chip) compliant with a PCI-express (PCI-E) standard at least includes four kinds of ID codes, i.e., a vender ID(VID) code, a device ID (DID) code, a sub-vendor ID (SVID) code, and/or a sub-device ID (SDID) code. In some embodiments of the disclosure, the ID code information may further include the version of the driver of the network communication unit 210; as such, after obtaining the ID code of the network communication unit 210, the operating system 240 may better understand the hardware support from the network communication unit 210. However, given that the network communication unit 210 is connected to the computer device 110 through other types of bus modules, the network communication unit 210 may have different types of ID codes, which will not be elaborated hereinafter.

The ID table 220 includes the ID codes respectively corresponding to different types of network communication units 210, and these ID codes serve as the input information. Each of the ID codes corresponds to one of a plurality of packet format types, and these packet format types may act as the output information. The particular packet format type corresponding to the network communication unit 210 belongs to one of the packet format types. These packet format types include a universal packet format type and at least one customized packet format type defined by manufacturers or set by the cloud application program.

To optimize the performance of the network communication unit 210 of the computer device 110 in terms of implementation of the WOL technology, the most adaptable WOL protocol packet format that may be supported by the corresponding network communication unit 210 may be selected according to the maker and the model number of each network communication unit 210; besides, the ID code of each network communication unit 210 serves as the input information, and the WOL protocol packet format serves as the output information, so as to generate the ID table 220. When the computer device 110 enters into the power-saving state from the normal operation state, the computer device 110 first obtains the ID code of the local network communication unit 210 and learns the most adaptable WOL protocol packet format that may be supported by the computer device 110 by looking up the ID table 220. After that, the computer device 110 transmits the package message to the remote device 130 through the network 120, so as to notify the remote device 130 of the fact that the computer device 110 is about to enter into the power-saving state and may be remotely waken up by means of the WOL packet format. In addition, relevant packet receiving configurations (e.g., an account number and a password of a user, relevant parameters of the remote device 130, etc.) may be provided to the computer device 110. After the computer device 110 enters into the power-saving state, the remote device 130 in the network 120 may remotely wake up the computer device 110 through a wake-up packet compliant with the optimal WOL protocol packet format, such that a user is able to remotely wake up the computer device 110 through the remote device 130. Here, the wake-up packet is determined through the communication between the remote device 130 and the computer device 110.

Since the computer device 110 determines the maker and the model number of the network communication unit 210 and then learns the optimal WOL protocol packet format that complies with the hardware specification of the corresponding network communication unit 210 by looking up the ID table, the required WOL technology can be implemented by optimizing the performance of the network chip in the computer device 110. In addition, the computer device 110 and the remote device 130 are communicated with each other and together set the WOL-related packet as well as transmit relevant parameters before the computer device 110 enters the power-saving state; hence, the network security may be significantly enhanced, and the computer device 110 can barely be remotely activated by a universal WOL packet format.

Figure 3:
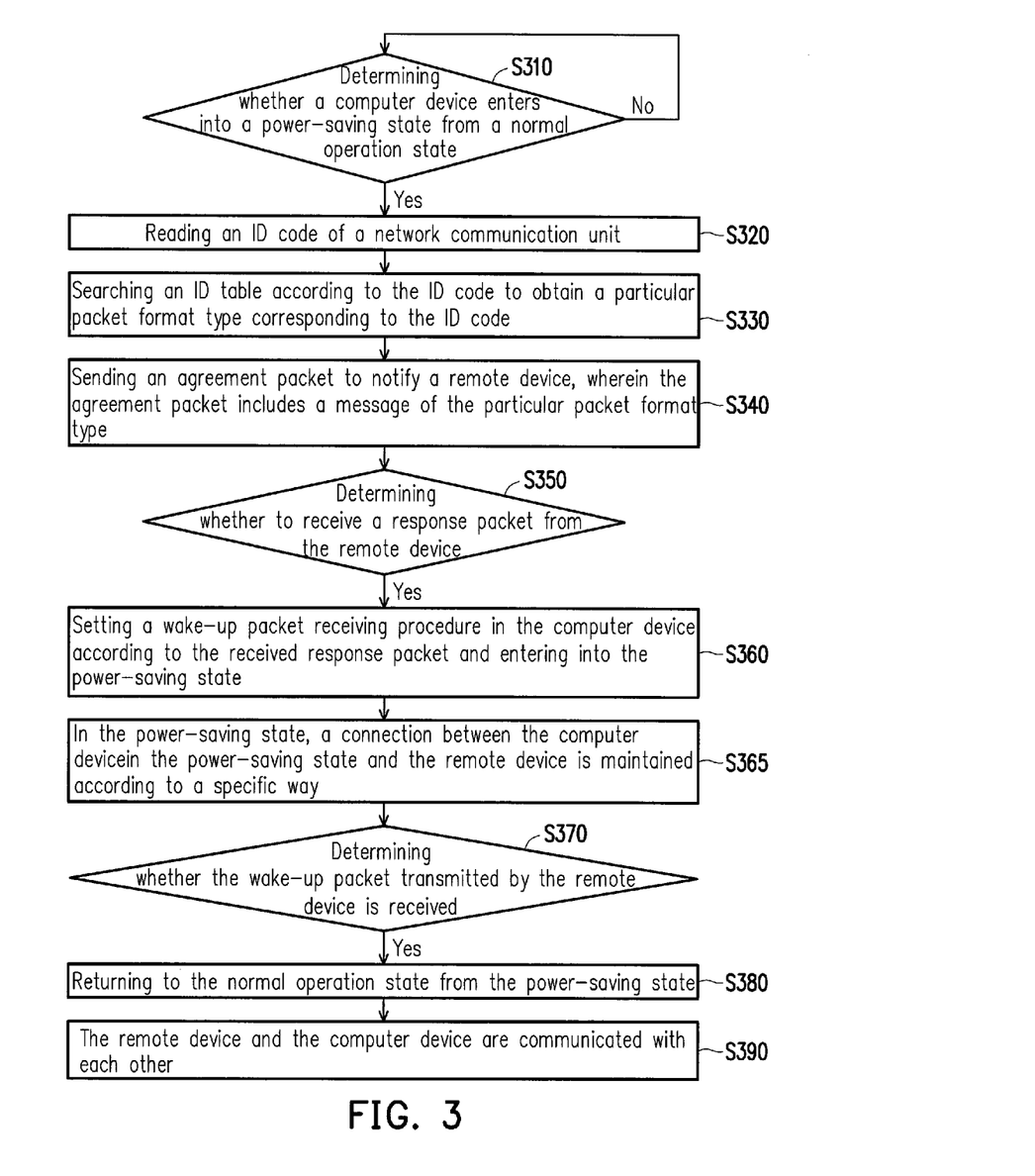
FIG. 3 is a flow chart illustrating a remote control method for a computer device according to an exemplary embodiment of the disclosure.
Figure 4:
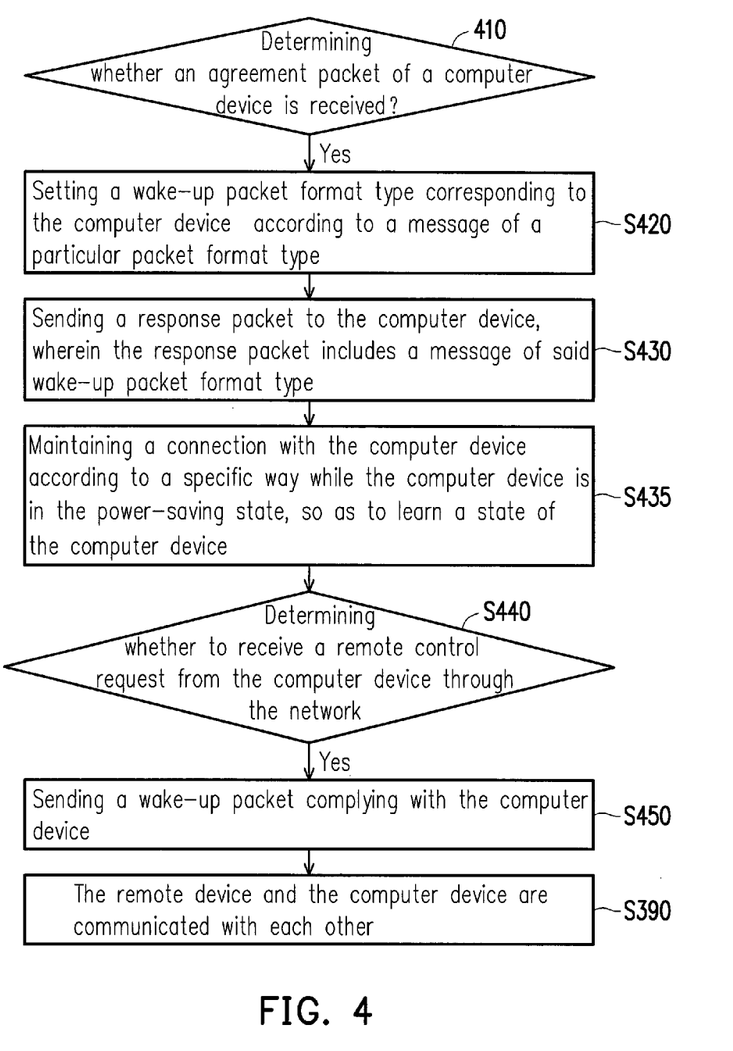
FIG. 4 is a flow chart illustrating a remote control method for a remove device.
Figure 5:
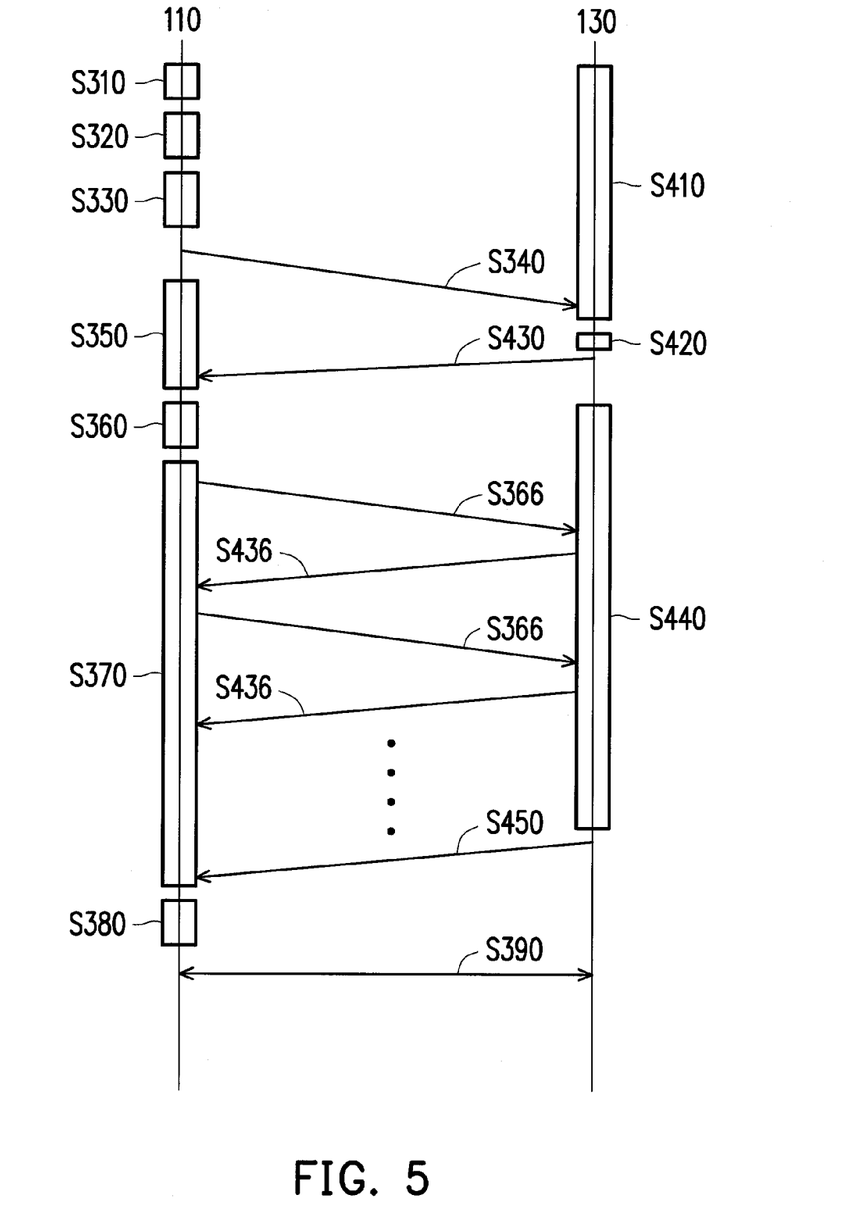
FIG. 5 is a schematic diagram illustrating a remote control method for a remove device according to an exemplary embodiment of the disclosure.

FIG. 3 is a flow chart illustrating a remote control method for the computer device 110 according to an exemplary embodiment of the disclosure. FIG. 4 is a flow chart illustrating a remote control method for the remove device 130. FIG. 5 is a schematic diagram illustrating a remote control method for the remove device 130 according to an exemplary embodiment of the disclosure. The following descriptions are provided with reference to FIG. 3 to FIG. 2, and the detailed hardware structure may also be referred to as that shown in FIG. 1 and FIG. 2. Here, the computer device 110 includes the network communication unit 210 shown in FIG. 2.

In step S310, the computer device 110 determines whether it enters into the power-saving state from the normal operation state. The power-saving state of the computer device 110 includes but is not limited to a standby state, a sleep state, a power-off state, and/or a communication standby state defined by the Microsoft operating system or any other operating system. In the corresponding step S410, the remote device 130 constantly determines whether an agreement packet of the computer device 110 is received.

When the computer device 110 in the normal operation state is about to enter into the power-saving state, a step S320 following the step S310 is performed, and the computer device 110 reads the ID code of the network communication unit 210 (shown in FIG. 2) through the operating system 240 depicted in FIG. 2. In step S330, the computer device 110 searches the ID table 220 stored in the storage unit 230 (shown in FIG. 2) according to the ID code of the network communication unit 210, so as to obtain the particular packet format type corresponding to the ID code of the network communication unit 210. It should be mentioned that the ID table 220 may be stored in the storage unit 230 of the computer device 110 in advance by executing the cloud application program 250; alternatively, when the computer device 110 is in the normal operation state, the cloud application program 250 may be executed to download or update the subsequently required ID table 220 from the remote device 130 through the network 120.

In step S340, the computer device 110 sends the agreement packet to notify the remote device 130, and the agreement packet includes a message of the particular packet format type and a message that the computer device 110 is about to enter into the power-saving state. The computer device 110 in step S350 then determines whether to receive a response packet from the remote device 130.

After the remote device 130 receives the agreement packet, a step S420 following the step S410 is performed, i.e., a wake-up packet format type corresponding to the computer device 110 is set according to the message of the particular packet format type. In step S430, the remote device 130 sends the response packet to the computer device 110, and the response packet includes a message of said wake-up packet format type.

After the computer device 110 confirms the receipt of the response packet from the remote device 130, a step S360 following the step S350 is performed, i.e., setting a wake-up packet receiving procedure of the cloud application program in the computer device according to the received response packet and entering into the power-saving state. According to the steps S310 to S360 shown in FIG. 3 and the steps S410 to S430 shown in FIG. 4, the computer device 110 described herein may communicate with the remote device 130 to determine the adaptable wake-up packet receiving procedure and performing relevant setting processes before the computer device 110 enters into the power-saving state; thereby, the remote device 130 may optimally utilize the network communication unit in the computer device 110.

In order for the computer device 110 in the power-saving state not to be powered off in a compulsory manner nor encounter any issue that may result in the unlikelihood of remotely waking up the computer device 110, in step S365, a connection between the computer device 110 in the power-saving state and the remote device 130 is maintained by the computer device 110 and/or the remote device 130 according to a specific way, such that the remote device 130 is able to learn that the computer device 110 is still in the power-saving state and can still be woken up remotely. From another perspective, the remote device 130 may also maintain the connection with the computer device 110 according to the specific way while the computer device 110 is in the power-saving state, so as to learn a state of the computer device 110.

The specific way for maintaining the connection between the computer device in the power-saving state and the remote device described in an exemplary embodiment of the disclosure can be implemented in several ways, and that's take two cases as example. One case for implementing the specific way is, the computer device 110 in the power-saving state may periodically or irregularly sends a connection packet (e.g., keep-alive packet) to the remote device, as shown by the arrow S366 in FIG. 5.

From another perspective, the remote device 130 may also determine whether to receive the keep-alive packet from the computer device 110, so as to learn the state of the computer device 110 or even actively respond to the keep-alive packet and transmit a heart-beat signal to the computer device 110, as shown by the arrow S436 in FIG. 5. Thereby, the computer device 110 may be notified of the normal operation of the remote device 130.

Another case for implementing the specific way is, the remote device 130 may periodically or irregularly sends a connection packet (e.g., keep-alive packet) to the computer device 110 while the computer device 110 is in the power-saving state. the computer device 110 may also determine whether to receive the keep-alive packet from the remote device 130. Thereby, the computer device 110 may be notified of the normal operation of the remote device 130.

In the step S435 described in an embodiment of the disclosure, the remote device 130 may merely determine whether to receive the keep-alive packet from the computer device 110 without responding to the heart-beat signal.

In step S370, the computer device 110 determines whether the wake-up packet transmitted by the remote device 130 is received according to the wake-up packet receiving procedure and the hardware support from the network communication unit 210. In addition, in step S440, the remote device 130 constantly determines whether a user sends a remote control request from the computer device 110 through the network.

According to the present exemplary embodiment, when the user sends the remote control request to the remote device 130 from the computer device 110 through the network, a step S450 following the step S440 is performed, i.e., the remote device 130 sends the wake-up packet complying with the packet receiving procedure configured internally in the computer device 110. After the computer device 110 receives the wake-up packet, a step S380 following the step S370 is performed, i.e., the computer device 110 returns to the normal operation state from the power-saving state; in addition, a step S390 is performed, i.e., the remote device 130 and the computer device 110 are communicated with each other according to a command compliant with other remote wake-up protocols, and the user is allowed to remotely control the computer device 110 through the remote device 130. Moreover, the wake-up packet may be implemented in the form of a magic packet that is recognized by the WOL protocol and has the standardized specification. Note that other self-defined packet format with different specifications may also be applied to implement the wake-up packet according to the present exemplary embodiment.

To sum up, before the computer device described herein enters into the power-saving state (e.g., a standby state, a sleep state, a power-off state, or a communication standby state) from the normal operation state, the maker and the model number of the network communication unit (e.g., the network chip) within the computer device are looked up, so as to learn the WOL packet format type that has the optimal performance and is supportable by the network communication unit and notify the remote device of said WOL packet format type through the network. Thereby, before entering into the power-saving state, the computer device, together with the remote device, may confirm and set the WOL packet format type. As such, the required WOL technology may be implemented by optimizing the performance of network chips in the computer device without sacrificing the network security.

Although the disclosure has been described with reference to the above embodiments, it will be apparent to one of the ordinary skill in the art that modifications to the described embodiment may be made without departing from the spirit of the disclosure. Accordingly, the scope of the disclosure will be defined by the attached claims not by the above detailed descriptions.

What is claimed is:

1. A computer system comprising:
a computer device comprising a network communication unit and an ID table; and
a remote device communicating with the computer device through a network,
wherein the computer device reads an ID code of the network communication unit, searches the ID table according to the ID code to obtain a particular packet format type corresponding to the ID code, and sends an agreement packet to notify the remote device before the computer device enters into a power-saving state from a normal operation state, the agreement packet comprises a message of the particular packet format type, the computer device receives a response packet from the remote device to set a packet receiving procedure in the computer device and enters into the power-saving state, a connection between the computer device in the power-saving state and the remote device is maintained according to a specific way, and the computer device returns to the normal operation state when the computer device receives a wake-up packet complying with the packet receiving procedure from the remote device.

2. The computer system as recited in claim 1, wherein the ID table comprises the ID codes respectively corresponding to a plurality of network communication units, each of the ID codes corresponds to one of a plurality of packet format types, and the particular packet format type belongs to one of the packet format types.

3. The computer system as recited in claim 2, wherein the packet format types comprise a universal packet format type and at least one customized packet format type.

4. The computer system as recited in claim 1, wherein the ID table is stored in a storage unit of the computer device.

5. The computer system as recited in claim 1, wherein the remote device sets a wake-up packet format type corresponding to the computer device according to the message of the particular packet format type and sends the response packet after the remote device receives the agreement packet, and the response packet comprises a message of the wake-up packet format type.

6. The computer system as recited in claim 1, wherein the ID code comprises a vender ID, a device ID, a sub-vendor ID, and/or a sub-device ID.

7. The computer system as recited in claim 1, wherein the power-saving state of the computer device comprises a standby state, a sleep state, a power-off state, and/or a communication standby state.

8. The computer system as recited in claim 1, wherein the specific way for maintaining the connection between the computer device in the power-saving state and the remote device is that the computer device in the power-saving state sends a connection packet to the remote device.

9. The computer system as recited in claim 1, wherein the specific way for maintaining the connection between the computer device in the power-saving state and the remote device is that the remote device sends a connection packet to the computer device while the computer device is in the power-saving state.

10. A remote control method for a computer device comprising a network communication unit, the remote control method comprising:
reading an ID code of the network communication unit before the computer device enters into a power-saving state from a normal operation state;
searching an ID table according to the ID code to obtain a particular packet format type corresponding to the ID code;
sending an agreement packet to notify the remote device, wherein the agreement packet includes a message of the particular packet format type;
receiving a response packet from the remote device to set a packet receiving procedure in the computer device and entering into the power-saving state;
in the power-saving state, maintaining a connection with the remote device according to a specific way; and
returning to the normal operation state from the power-saving state when receiving a wake-up packet from the remote device, wherein the wake-up packet complies with the packet receiving procedure.

11. The remote control method as recited in claim 10, wherein the ID table comprises the ID codes respectively corresponding to a plurality of network communication units, each of the ID codes corresponds to one of a plurality of packet format types, and the particular packet format type belongs to one of the packet format types.

12. The remote control method as recited in claim 10, wherein the step for maintaining a connection with the remote device according to the specific way comprising:
   sending a connection packet to the remote device.

13. The remote control method as recited in claim 10, wherein the step for maintaining a connection with the remote device according to the specific way comprising:
   receiving the a connection packet to the computer device while in the power-saving state.

14. A remote control method for a remote device, the remote control method comprising:
   determining whether an agreement packet of a computer device is received, wherein the agreement packet comprises a message of a particular packet format type and a message that the computer device is about to enter into a power-saving state;
   after receiving the agreement packet, setting a wake-up packet format type corresponding to the computer device according to the message of the particular packet format type;
   sending a response packet to the computer device, wherein the response packet comprises a message of the wake-up packet format type;
   maintaining a connection with the computer device according to a specific way while the computer device is in the power-saving state, so as to learn a state of the computer device;
   determining whether to receive a remote control request from the computer device through a network; and
   when receiving the remote control request, sending a wake-up packet complying with the computer device, such that the remote device and the computer device are communicated with each other.

15. The remote control method as recited in claim 14, wherein the step for maintaining a connection with the computer device according to the specific way comprising:
   receiving a connection packet from the computer device in the power-saving state.

16. The remote control method as recited in claim 14, wherein the step for maintaining a connection with the remote device according to the specific way comprising:
   sending the a connection packet to the remote device.

* * * * *